UNITED STATES PATENT OFFICE.

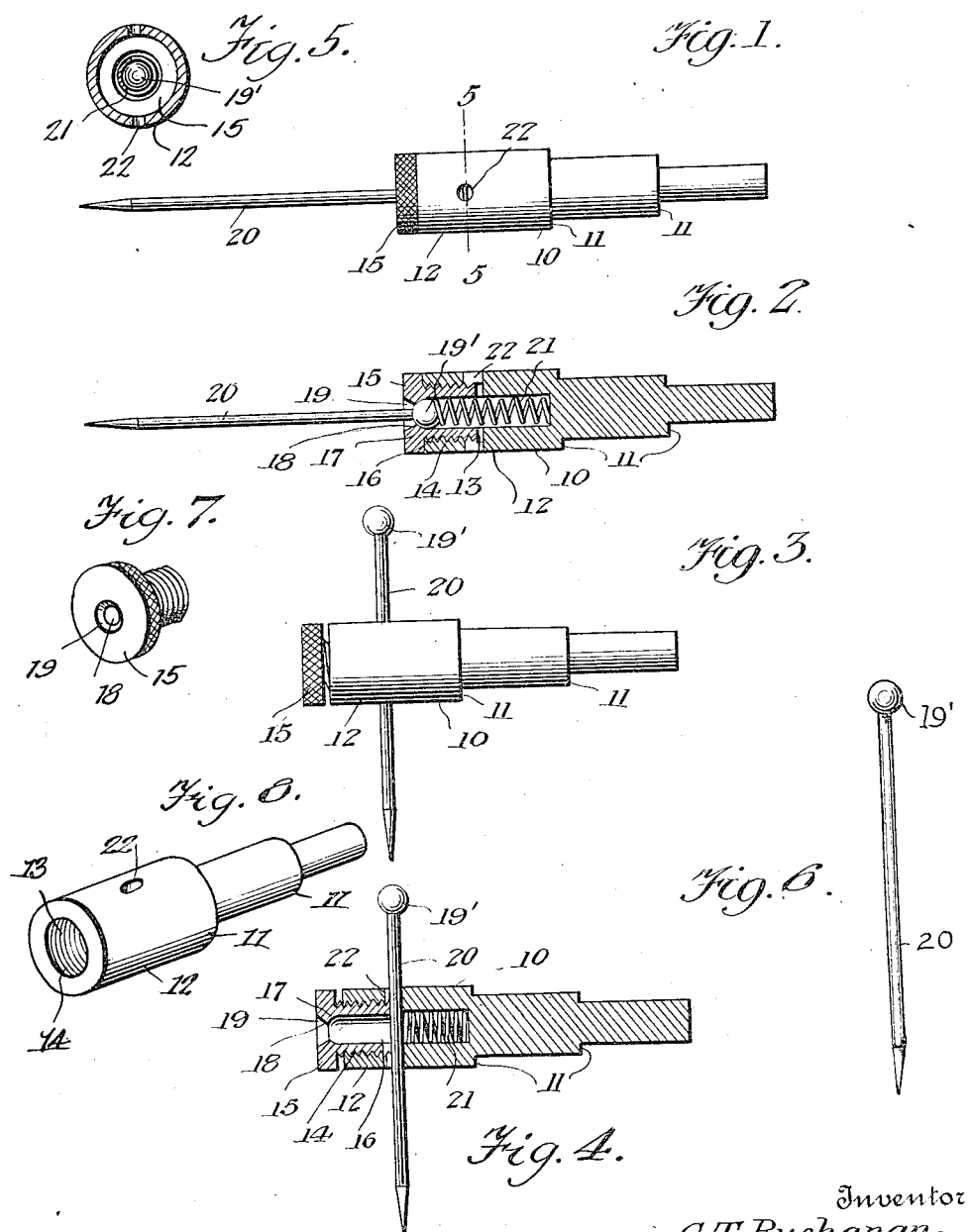

GEORGE T. BUCHANAN, OF WINNSBORO, SOUTH CAROLINA.

LOCATING-TOOL.

1,289,640.

Specification of Letters Patent.   Patented Dec. 31, 1918.

Application filed May 29, 1918.   Serial No. 237,313.

*To all whom it may concern:*

Be it known that I, GEORGE T. BUCHANAN, a citizen of the United States, residing at Winnsboro, in the county of Fairfield and State of South Carolina, have invented new and useful Improvements in Locating-Tools, of which the following is a specification.

This invention relates to a locating tool for machinists and has for its object to produce in one instrument a combined centering device and depth gage.

An object of the invention is to produce a simple and inexpensive tool wherein positive and reliable means are employed for holding a needle point in the center punch mark of the work to be operated upon so that the degree of wabbling of the said needle will indicate the extent that the work is out of line. The needle point is removable, and when not employed for centering may be arranged right angularly of the tool and held adjusted in this position by the same means that sustains the said pin axially of the tool so that the tool may be thus employed as a depth gage.

I accomplish the foregoing objects, and others which will appear as the nature of the invention is better understood, by a simple construction, combination and operative arrangement of parts, a satisfactory exemplification of which is illustrated by the drawings.

In the drawings:

Figure 1 is a side elevation of a tool constructed in accordance with this invention showing the needle arranged for centering;

Fig. 2 is a longitudinal sectional view of the same;

Fig. 3 is a side elevation illustrating the tool employed as a depth gage;

Fig. 4 is a longitudinal sectional view through the same;

Fig. 5 is a sectional view approximately on the line 5—5 of Fig. 1;

Fig. 6 is a view of the needle;

Fig. 7 is a view of the cap for the head of the spindle; and

Fig. 8 is a perspective view of the spindle.

In the operation of drill-presses and similar machines it frequently becomes necessary to properly center the work in order that drills may operate thereon at particular points previously indicated upon the work, so that the drill will not only be brought to the proper point for operation on the work, but will be brought into proper alinement to effect its operation. In the operation of lathes and similar machines it is frequently necessary to properly center the work in the work holder or "chuck" in order that the tools may properly perform their work. It is a customary plan in centering work for drill presses and similar machines to place the work upon the press underneath the drill and then cause the drill to descend toward the work while the work holder is shifted and adjusted by hand, so as to bring the proper point where the drill is to enter the work in proper position therefor. This is not only laborious but requires a considerable amount of time as well as care and skill. With my improvement, I provide a simple and inexpensive tool whereby the work for drill-presses or similar machinery may be quickly brought to centering position to receive the drill without exercise of special care or skill and without the loss of time. Also with my improvement I can, by a simple readjustment of parts provide a means for gaging the depth of work.

As disclosed by the drawings, the improvement includes a spindle which is broadly indicated by the numeral 10. The spindle is in the nature of a stepped member providing a plurality of shoulders 11—11 and gradually reduced portions connecting the shoulders so that the same may be easily and quickly attached to various sizes of "chucks". Integrally formed with the spindle is an outer enlarged portion providing what I will term a head 12, and this head has a central bore or pocket 13 which is round and which, adjacent to the outer end thereof is threaded as at 14.

On the outer end of the head 12 is arranged a cap 15, the same having a central reduced boss 16 which is exteriorly threaded and which threads co-act with the threads 14 in the bore 13 of the head 12. The boss, from the outer end thereof is provided with a round depression or pocket 17, the inner wall of which is flared as at 18 and centrally communicates with a reduced opening 19 which extends through the cap 15. The flared depression 18 serves as a seat for a round head 19' on a centering pin 20, and this pin is forced against its seat by a helical spring 21 arranged in the pocket 13. The operation of this class of instruments is well known, so that a more detailed description of the advantages and operation of the construction than that heretofore given is not deemed necessary.

The head 12 is provided with a transverse opening 22 arranged preferably in a line with the juncture between the threaded and unthreaded portion of the bore or pocket 13 and through this opening 22 the pin 20 is designed to be passed when the device is employed as a depth gage. If desired, the spring may be compressed and arranged against one of the sides of the pin and thereafter the cap 15 is screwed on the head 12, the boss 16 contacting with one of the sides of the pin to hold the same properly adjusted on the head.

Having thus described the invention, what I claim is:

In a combined wiggler and depth gage, a spindle having a round shank which is stepped throughout its length and which has its larger end provided with a hollow head, and said head having a transverse opening therethrough, a cap having a central boss adjustably engaging in the hollow head and normally closing said head, said boss having a depression, the inner wall of which is flared, and the cap having an opening communicating with the said depression, a headed pin received on the referred to flared wall in the boss and extending through the opening in the cap, when the device is employed as a wiggler, a spring in the head for normally holding the pin in axial alinement with the spindle, and said pin adapted to be passed through the transverse opening in the head and to be contacted by the boss of the cap for adjustably sustaining the same on the spindle when the device is employed as a depth gage.

In testimony whereof I affix my signature.

GEORGE T. BUCHANAN.

Copies of this patent may be obtained for five cents each, by addressing the "Commissioner of Patents, Washington, D. C."